US008582963B2

(12) United States Patent
Li

(10) Patent No.: US 8,582,963 B2
(45) Date of Patent: Nov. 12, 2013

(54) DETECTION OF SUBSTRATE WARPING DURING RAPID THERMAL PROCESSING

(75) Inventor: Jiping Li, Palo Alto, CA (US)

(73) Assignee: Applied Materials, Inc., Santa Clara, CA (US)

( * ) Notice: Subject to any disclaimer, the term of this patent is extended or adjusted under 35 U.S.C. 154(b) by 264 days.

(21) Appl. No.: 13/153,135

(22) Filed: Jun. 3, 2011

(65) Prior Publication Data

US 2012/0308215 A1 Dec. 6, 2012

(51) Int. Cl.

| | |
|---|---|
| ***G01B 11/14*** | (2006.01) |
| ***F27B 5/06*** | (2006.01) |
| ***F27D 5/00*** | (2006.01) |

(52) U.S. Cl.
USPC ........... 392/418; 392/422; 219/390; 219/392; 118/728; 356/621

(58) Field of Classification Search
None
See application file for complete search history.

(56) References Cited

U.S. PATENT DOCUMENTS

| | | | | |
|---|---|---|---|---|
| 5,798,532 | A * | 8/1998 | Linehan | 250/559.22 |
| 6,031,607 | A * | 2/2000 | Miyazaki | 356/237.1 |
| 6,191,394 | B1 * | 2/2001 | Shirakawa et al. | 219/444.1 |
| 6,433,352 | B1 * | 8/2002 | Oka | 250/559.3 |
| 6,654,668 | B1 * | 11/2003 | Harada et al. | 700/299 |
| 6,678,055 | B2 * | 1/2004 | Du-Nour et al. | 356/504 |
| 7,414,224 | B2 | 8/2008 | Aderhold et al. | |
| 7,489,410 | B2 * | 2/2009 | Nishio | 356/614 |
| 7,667,857 | B2 * | 2/2010 | Nishio | 356/614 |
| 7,933,009 | B2 * | 4/2011 | Serebryanov et al. | 356/213 |
| 8,138,456 | B2 * | 3/2012 | Fukuda et al. | 219/497 |
| 2006/0126050 | A1 * | 6/2006 | Momose | 355/72 |
| 2007/0107659 | A1 * | 5/2007 | Van Mast et al. | 118/695 |
| 2008/0171131 | A1 * | 7/2008 | Moro et al. | 427/8 |
| 2008/0206902 | A1 * | 8/2008 | Bour et al. | 438/14 |
| 2009/0027657 | A1 * | 1/2009 | Serebryanov et al. | 356/73 |
| 2009/0141288 | A1 * | 6/2009 | Nishio | 356/614 |
| 2010/0008656 | A1 | 1/2010 | Sorabji et al. | |
| 2012/0006263 | A1 * | 1/2012 | Hashimoto et al. | 118/712 |

* cited by examiner

*Primary Examiner* — Joseph M Pelham
(74) *Attorney, Agent, or Firm* — Patterson & Sheridan, LLP

(57) ABSTRACT

Apparatus and methods for detecting substrate warping during RTP processing are provided. In one embodiment, one or more beams of light are provided above and across the substrate being processed. In this embodiment, the amount of beam blockage correlates to the amount of substrate warping. In another embodiment, a beam of light is reflected off of a substrate during processing. In this embodiment, the amount of movement of the beam correlates to the amount of substrate warping. In yet another embodiment, a region of a substrate is illuminated during processing. In this embodiment, images of the illuminated region are analyzed to determine the amount of substrate warping.

15 Claims, 6 Drawing Sheets

DETECTION OF SUBSTRATE WARPING DURING RAPID THERMAL PROCESSING

BACKGROUND OF THE INVENTION

1. Field of the Invention

Embodiments of the present invention generally relate to apparatus and methods for detection of substrate warping during rapid thermal processing.

2. Description of the Related Art

Although annealing in early stages of silicon technology typically involved heating multiple wafers for long periods in an annealing oven, rapid thermal processing (RTP) has been increasingly used to satisfy the increasingly stringent requirements for increasingly smaller circuit features. RTP is typically performed in single-substrate chambers by irradiating a substrate with light from an array of high intensity lamps. The radiation is absorbed by the substrate and quickly heats it to a desired temperature, such as above 600 degrees Celsius. The radiant heating can be quickly turned on and off to controllably heat the substrate over a relatively short period of time, e.g., a few seconds.

During RTP processing, particularly during initial recipe setup processes, non-uniform substrate heating may occur. Rapid, non-uniform heating of the substrate results in warping of the substrate. In addition, due to the typically narrow gap between the substrate and a reflector plate situated above (or below) the substrate, the warped substrate may contact the reflector plate while the substrate is rotating. Force from this contact may lead to a number of undesirable results, such as moving the substrate from its support, scratching the substrate, or breaking the substrate.

Therefore, there is a need for effective methods and apparatus for detecting substrate warping during RTP to reduce the risk of substrate and/or equipment damage.

SUMMARY OF THE INVENTION

In one embodiment of the present invention, a chamber comprises one or more chamber walls, a chamber bottom, and a chamber lid enclosing a processing volume. The chamber further comprises a substrate support disposed within the processing volume, a laser device positioned to emit a beam of light substantially parallel to an upper surface of the substrate support, and a detection device coupled to the chamber above the substrate support.

In another embodiment, a rapid thermal processing chamber comprises one or more chamber walls, a chamber bottom, and a chamber lid enclosing a processing volume. The chamber further comprises a substrate support disposed within the processing volume, a laser device coupled to the chamber above the substrate support, and a detection device. The laser device is positioned to emit a first beam of light toward an upper surface of the substrate support. The detection device determines an amount of change in a position of a second beam of light, wherein the second beam of light is a reflection of the first beam.

In yet another embodiment, a rapid thermal processing chamber comprises one or more chamber walls, a chamber bottom, and a chamber lid enclosing a processing volume. The chamber further comprises a substrate support disposed within the processing volume, a laser device coupled to the chamber above the substrate support, and a detection device coupled to the chamber above the substrate support. The laser device is positioned to emit light onto a region of substrate positioned on a substrate supporting surface of the substrate support. The detection device is positioned to capture images of the illuminated region.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the present invention generally provide apparatus and methods for detecting substrate warping during RTP processes. In one embodiment, a laser beam is directed above and substantially parallel to an upper surface of a substrate disposed in an RTP chamber prior to heating. The beam is provided by a laser device disposed in one side wall of the chamber and detected by a detection device in an opposite side wall of the chamber. If the substrate warps during processing, at least a portion of the beam is blocked by the substrate, indicating that an undesirable amount of substrate warping has occurred.

In another embodiment, a laser beam is directed onto an edge region of a substrate disposed in an RTP chamber. The beam is provided by a laser device disposed in a chamber lid. The beam is reflected off of the substrate and detected by a detection device disposed in the chamber lid. If the substrate warps during processing, the reflected beam moves, and the detection device indicates the amount of movement, and thus, the amount of warping of the substrate.

In yet another embodiment, a laser beam is scanned across an upper surface of an edge region of a substrate disposed in an RTP chamber. The beam is provided by a laser device disposed in one side wall of the chamber, and a camera is disposed in an opposite side wall of the chamber. The beam illuminates the edge region, and the camera is focused on the edge region. If the substrate warps during processing, the angle of light scattered by the edge region and captured by the camera changes, indicating warping of the substrate.

Figure 1:
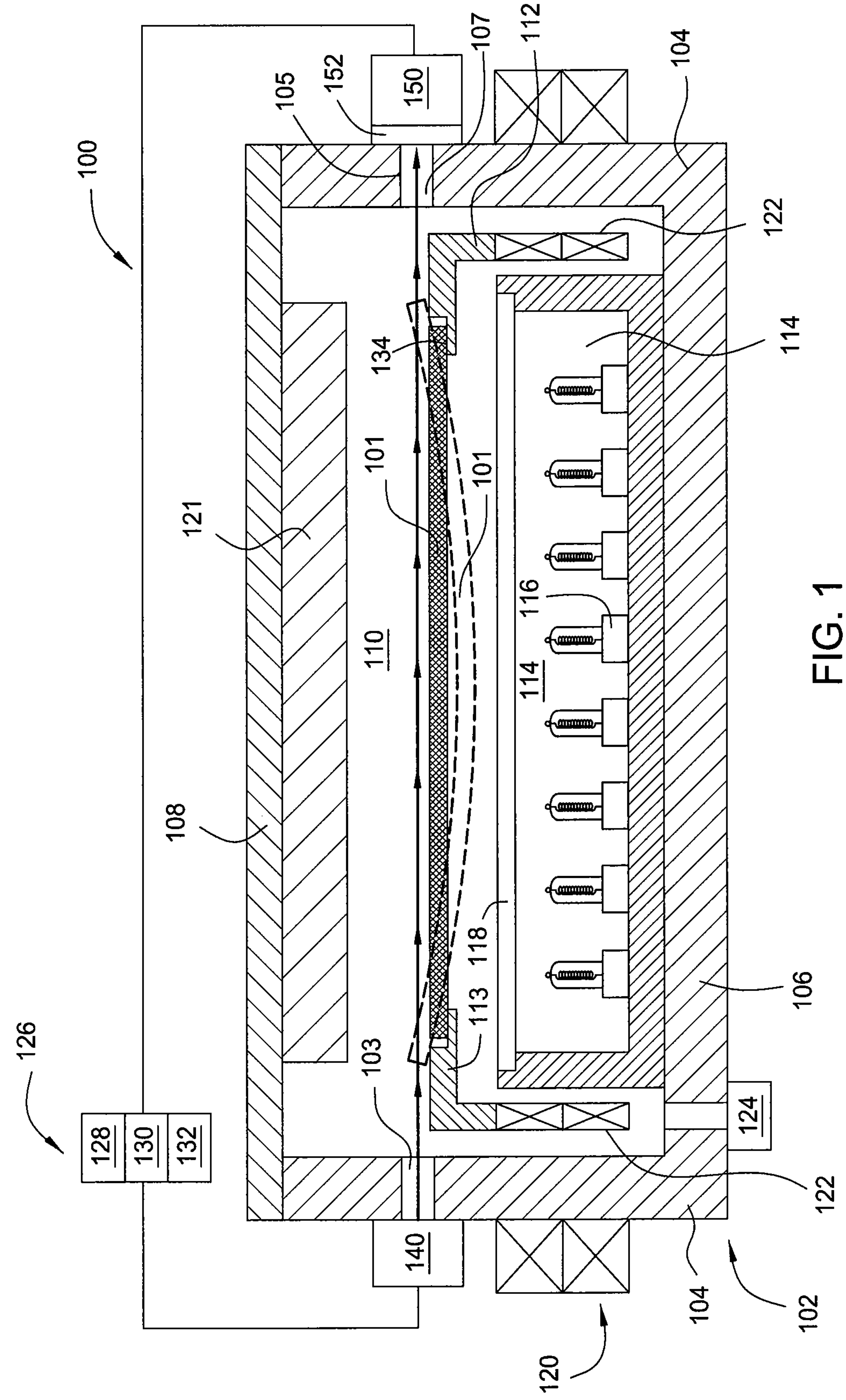
FIG. 1 is a schematic, cross-sectional view of an RTP chamber according to one embodiment of the present invention.

FIG. 1 is a schematic, cross-sectional view of an RTP chamber 100 according to one embodiment of the present invention. The RTP chamber 100 includes a chamber body 102 having a cylindrical side wall 104, a bottom wall 106, and a chamber lid 108 defining an interior volume 110. The chamber 100 further includes a substrate support 112 having an edge ring 113 for supporting a substrate 101. Below the substrate support 112 is a radiant heat source 114 that may include a plurality of high intensity lamps 116, such as tungsten-halogen lamps. The radiant heat source also has a window 118 made from a material that is transparent to heat and light, such as quartz. The RTP chamber 100 further includes a lid 108 with a reflector plate 121 attached thereto.

The substrate support 112 shown is adapted to magnetically levitate and rotate within the interior volume 110. To provide the magnetic levitation and rotation, a stator assembly 120 circumscribes the wall 104 of the chamber body 102. The stator assembly 120 is magnetically coupled to a rotor assembly 122 disposed in the substrate support 112.

An atmosphere control system 124 is also coupled to the interior volume 110 of the chamber body 102. The atmosphere control system 124 generally includes one or more throttle valves and one or more vacuum pumps for controlling chamber pressure. The atmosphere control system 124 may additionally include gas sources for providing gases into the interior volume 110.

The chamber 100 also includes a controller 126, which generally includes a central processing unit (CPU) 128, support circuits 130, and memory 132. The CPU 128 may be one of any form of computer processor that can be used in an industrial setting for controlling various actions and subprocessors. The memory 132, or computer-readable medium, may be one or more of readily available memory, such as random access memory (RAM), read only memory (ROM), floppy disk, hard disk, or any other form of digital storage, local or remote, and is typically coupled to the CPU 128. The support circuits 130 are coupled to the CPU 128 for supporting the control system 124 in a conventional manner. These circuits include cache, power supplies, clock circuits, input/output circuitry, subsystem, and the like.

A laser device 140 is coupled to the side wall 104 in one region of the chamber body 102, and a detection device 150 is coupled to the side wall 104 in an opposite region of the chamber body 102. The laser device 140 is positioned to provide a beam of light (e.g., 1-3 mm diameter beam) through a window 103 in the chamber wall 104 and at a height of about 1 mm to about 10 mm above the surface of the substrate 101 positioned on the substrate support 112 at ambient temperature. The laser device 140 is positioned to provide the beam substantially parallel to a supporting surface 134 of the edge ring 113 (i.e., upper surface), and is thus, substantially parallel to the upper surface of the substrate 101 positioned on the substrate support 112 at ambient temperature. The beam provided from the laser device 140 is transmitted substantially parallel to the substrate supporting surface 134 of the edge ring 113 at a height of between about 1 mm and about 10 mm above the substrate 101 supported thereon at ambient temperature. In one embodiment, substantially parallel means less than three degrees from parallel. Preferably, the beam is emitted at less than 1.0 degrees from parallel. The laser device 140 may be any laser device capable of generating a beam of light at less than about 1000 nm (e.g., 632 nm, 810 nm, 925 nm). These wavelengths are selected so that the laser light is not transmitted through the silicon substrate 101 either at ambient or at elevated temperatures (e.g., greater than about 600 degrees Celsius). Other longer wavelength lasers can also be used, but at a lesser sensitivity at a lower temperature range (e.g., <500 degrees Celsius).

The detection device 150 is positioned to receive the beam through an aperture 105 and window 107 in the chamber wall 104. The aperture 105 may be configured in the shape of a tube in order to define a direction relative to the detection device 150 along which light is permitted to pass in order to filter much of the light emitted from the radiant heat source 114 prior to reaching the detection device 150. For example, the aperture 105 may be provided at a diameter of between about 3 mm and about 7 mm with a length to diameter ratio of between about 5:1 and about 10:1. Alternatively, a separate tube aperture (not shown) may be disposed through the chamber wall 104 to provide the light filtering.

The detection device 150 may be any suitable sensor for detecting the presence of a beam of light, such as a photodiode or the like. The detection device 150 provides a signal indicative of the presence or absence of light received from the laser device 140. In addition, a filter 152 is provided to further ensure that only desired wavelengths of light reach the detection device 150. The filter 152 may be a band pass filter, e.g., 10 nm to 20 nm band pass filter.

In operation, the controller 126 provides instructions to the laser device 140 to emit a beam (e.g., 3 mm beam) in the RTP chamber 100 with the substrate 101 at ambient temperature. In one embodiment, a continuous beam is emitted in an operation in which radiant heat is provided from the radiant heat source 114 in a continuous manner. In another embodiment, in which radiant heat is provided in a non-continuous manner, the intensity of the beam is modulated. The beam passes across the substrate 101, through the aperture 105 and the filter 152, before impinging on the detection device 150. The detection device 150, in turn, provides a signal to the controller 126 that the full beam is being received, thus, no substrate warping is detected. In the embodiment in which a modulated beam is provided, the detector signal is amplified and only the modulated signal is used as the sense signal. This scheme further acts as a filter to remove the "noise" of the light emitted from the radiant heat source 114.

As the RTP chamber 100 heats the rotating substrate 101, if the substrate 101 begins to warp (shown by dotted line in FIG. 1), a portion of the substrate 101 blocks a portion of the beam. When a portion of the beam is blocked, the detection device 150 receives less light, and its signal to the controller 126 is weaker. Once a programmed threshold is reached (e.g., indicating that half of the beam is blocked), the controller 126 may take action, such as sending instructions for shutting down the process or signaling the operator that undesirable substrate warping has occurred. Thus, damage to the substrate 101 and/or the chamber 100 components may be averted.

Figure 2A:
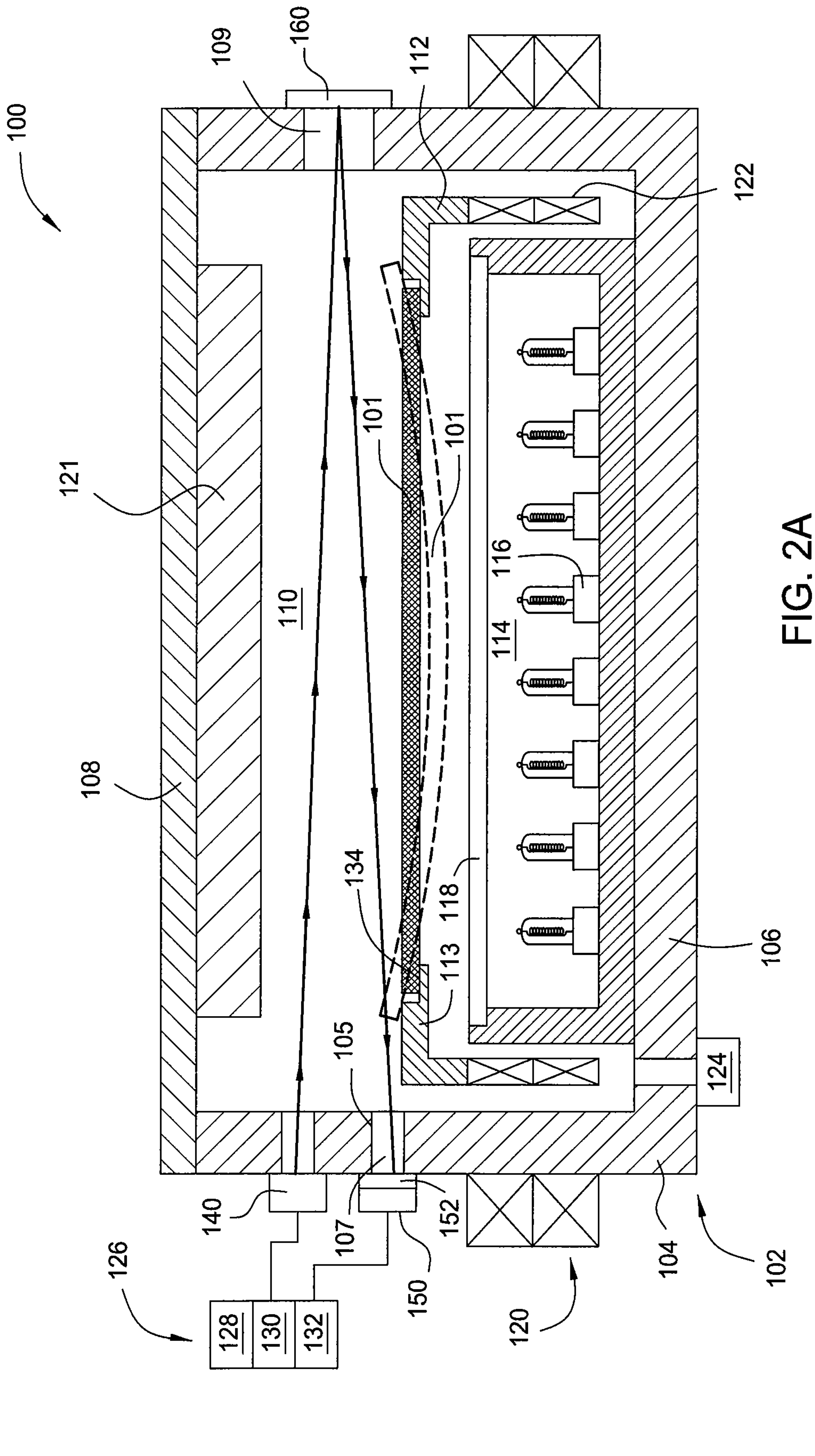
FIG. 2A is a schematic, cross-sectional view of an RTP chamber according to another embodiment.

FIG. 2A is a schematic, cross-sectional view of the RTP chamber 100 according to another embodiment. The RTP chamber 100 depicted in FIG. 2A is similar to that depicted in FIG. 1 except that the laser device 140 and the detection device 150 are disposed adjacent one another in the chamber wall 104. In the example shown in FIG. 2A, the laser device 140 is above the detection device 150; however, the detection device 150 could be provided above the laser device 140 without departing from the scope of the invention. A mirror 160 is disposed on the chamber wall 104 on a side of the chamber body 102 opposite the laser device 140 and detection device 150. The mirror 160 is coupled to the chamber wall 104 adjacent a window 109.

Figure 2B:
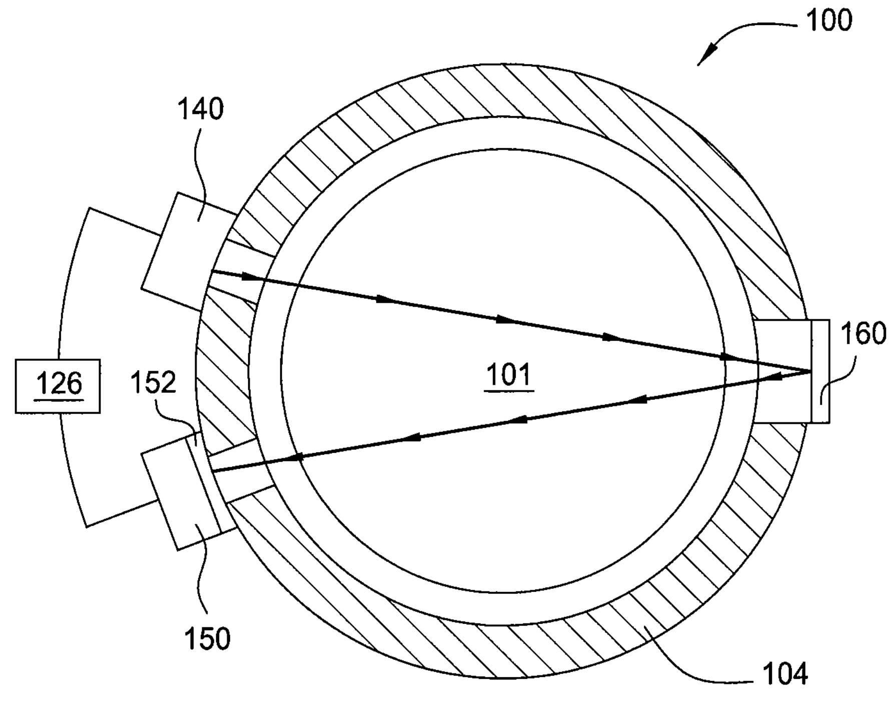
FIG. 2B is a schematic, top, cross-sectional view of an RTP chamber according to another embodiment.
Figure 2C:
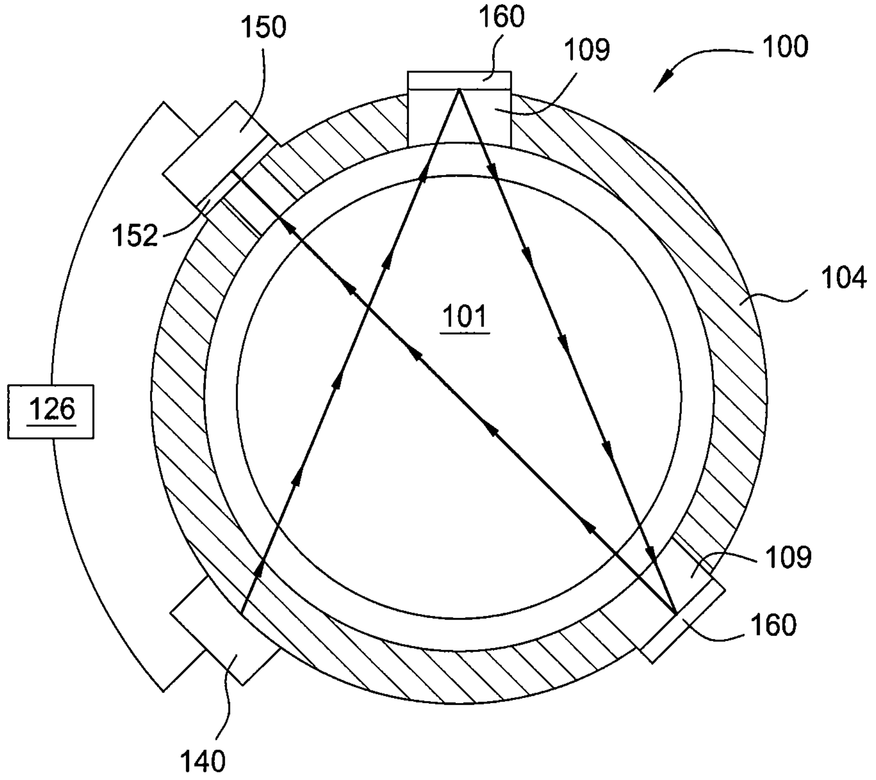
FIG. 2C is a schematic, top, cross-sectional view of an RTP chamber according to another embodiment.

FIGS. 2B and 2C are schematic, top, cross-sectional views of the RTP chamber 100 according to other embodiments. The configuration depicted in FIG. 2B is substantially similar to that of FIG. 2A except that the laser device 140 and the detection device 150 are positioned side-by-side rather than one above the other. In this configuration, as in the configuration of FIG. 1, the beam provided from the laser device 140 is transmitted substantially parallel to the substrate supporting surface 134 of the edge ring 113 at a height of between about 1 mm and about 10 mm above the substrate 101 supported thereon at ambient temperature. The beam is reflected by the mirror 160 projected to the detection device 150 substantially parallel and at about the same height as the beam projected from the laser device 140. Thus, more robust substrate warping detection is provided by the configuration of FIG. 2B than that of FIGS. 1 and 2A because the beam is passed over the substrate 101 in two regions rather than just one region.

The configuration depicted in FIG. 2C is substantially similar to that of FIG. 2B except that the laser device 140 and the detection device 150 are spread apart and angled such that the beam projected from the laser device 140 is reflected by a plurality of mirrors 160 and passed over a plurality of regions of the substrate 101 prior to impinging on the detection device 150. Thus, more robust substrate warping detection is provided by the configuration of FIG. 2C than the configuration of FIGS. 1, 2A, and 2B.

The operation of the configurations depicted in FIGS. 2A-2C is substantially the same as for the configuration depicted in FIG. 1. For example, as the RTP chamber 100 heats the rotating substrate 101, if the substrate 101 begins to warp (shown by dotted line in FIG. 2A), a portion of the substrate 101 blocks a portion of the beam. When a portion of the beam is blocked, the detection device 150 receives less light, and its signal to the controller 126 is weaker. Once a programmed threshold is reached (e.g., indicating that half of the beam is blocked), the controller 126 may take action, such as sending instructions for shutting down the process or signaling the operator that undesirable substrate warping has occurred.

Figures 3A, 3B:
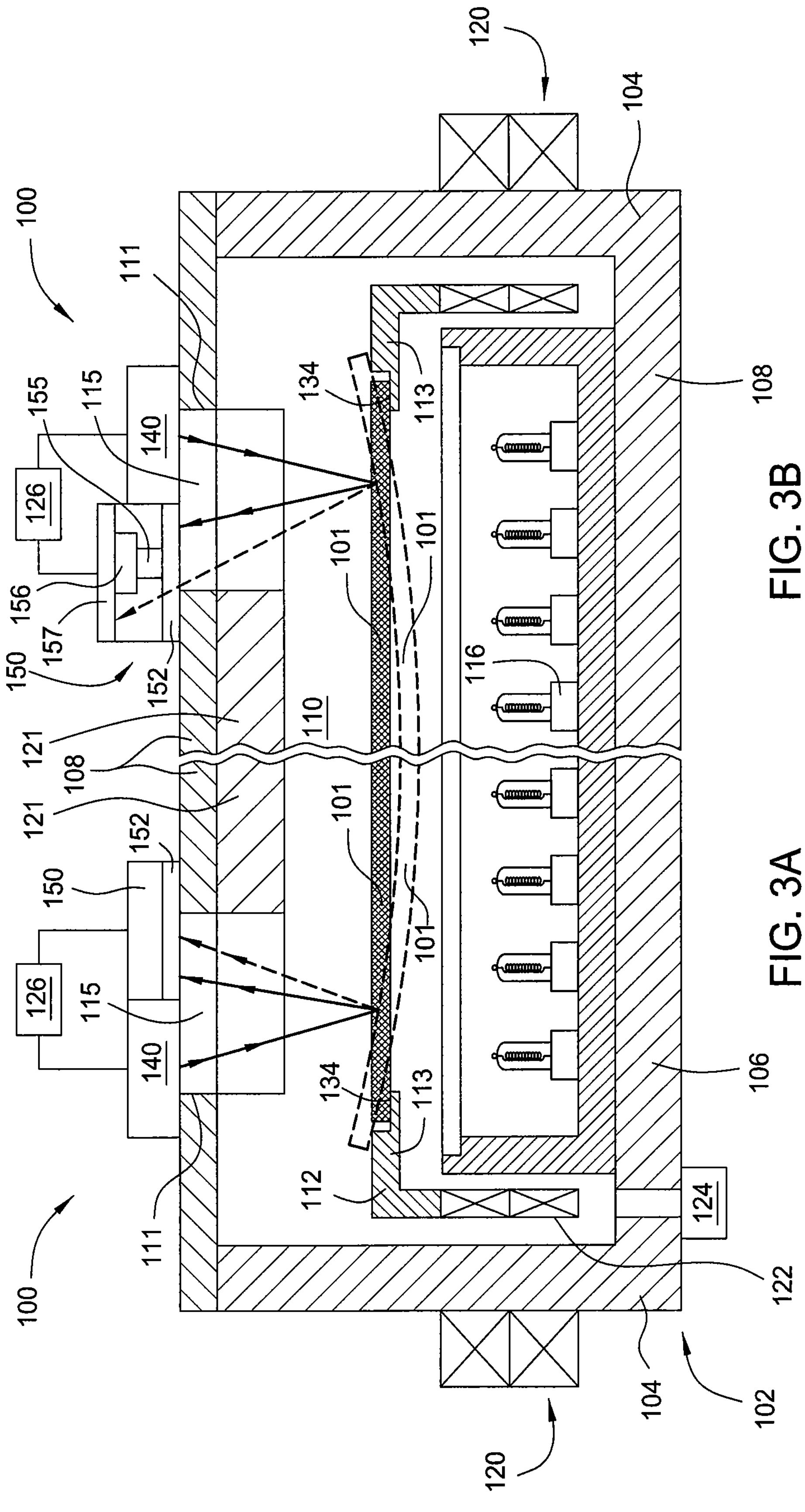
FIG. 3A is a schematic, partial, cross-sectional view of an RTP chamber according to another embodiment.
FIG. 3B is a schematic, partial, cross-sectional view of an RTP chamber according to another embodiment.

FIGS. 3A and 3B are schematic, partial, cross-sectional views of the RTP chamber 100 according to further embodiments of the present invention. In FIG. 3A, the laser device 140 is substantially the same as that of the previously described configurations, but it is coupled to the chamber lid 108 rather than the chamber wall 104. Accordingly, the chamber lid 108 and the reflector plate has an aperture 111 disposed therethrough covered by a window 115. In addition, the detection device 150 and filter 152 are coupled to the chamber lid 108 as well. In the configuration depicted in FIG. 3A, the detection device 150 is a detector capable of detecting the position/movement of a beam of light across its field of view rather than just the presence of a beam of light impinging upon it. For example, the detection device 150 may be a position sensitive detector (PSD) or a camera (e.g., CCD camera).

In operation, the controller 126 provides instructions to the laser device 140, which projects a beam of light toward an edge region of the rotating substrate 101. The beam is reflected by the substrate 101 toward the detection device 150. The angle of the beam projected by the laser device 140 is calibrated so that the beam reflected from the planar substrate 101 at ambient temperature impinges substantially on the center of the detection device 150. For example, the laser device 140 may be positioned to emit a beam that is reflected at an angle of between 0 and 45 degrees, and the reflected beam is directed onto the center of the detection device 150. As the RTP chamber 100 heats the rotating substrate 101, if the substrate 101 begins to warp (shown by dotted line in FIG. 3A), the angle of the reflected beam changes, and the beam impinges on the detection device 150 at a different location. Signals from the detection device 150 indicating the location of the beam, and thus, the amount of warping of the substrate 101 are provided to the controller 126. The controller 126 may provide feedback to an operator indicating the amount of substrate 101 warping. Additionally, the controller 126 and detection device 150 may be calibrated to take action if a programmed threshold is reached. For example, the detection device may be able to detect up to a one degree movement of the reflected beam from the center of the detection device. However, an unacceptable amount of warping may correlate to a 0.5 degree deviation in the reflected angle. When the detection device 140 detects an amount of movement in the position of the reflected beam that is 0.5 degrees on greater, the controller 126 may send instructions for shutting down the process or signal the operator that undesirable substrate warping has occurred.

FIG. 3B shows an alternate configuration, which is substantially similar to that of FIG. 3A, except that rather than a single PSD or camera, the detection device 150 is made up of a plurality of stacked photodetectors, such as a plurality of stacked photodiodes. In the configuration shown, a lower photodetector 155 has a first diameter, and is positioned adjacent the filter 152. Above the lower photodetector 155 is an intermediate photodetector 156 having a second diameter greater than the first diameter of the lower photodetector 155. Above the intermediate photodetector is an upper photodetector 157 having a third diameter greater than the second diameter of the intermediate photodetector 156. The photodetectors 155-157 are sized and arranged such that as the reflected beam moves, the beam transitions from the lower photodetector 155 to the intermediate photodetector 156 to the upper photodetector 157. Thus, in operation the plurality of photodetectors 155-157 function similarly to the single detection device 150 described with respect to the configuration of FIG. 3A. Although three photodetectors are depicted and described with respect to FIG. 3B, two or more photodetectors may be used to accomplish the same scheme without departing from the scope of the present invention.

In operation, the controller 126 provides instructions to the laser device 140, which projects a beam of light toward an edge region of the rotating substrate 101. The beam is reflected by the substrate 101 toward the detection device 150. The angle of the beam projected by the laser device 140 is calibrated so that the beam reflected from the planar substrate 101 at ambient temperature impinges on the lower photodetector 155. As the RTP chamber 100 heats the rotating substrate 101, if the substrate 101 begins to warp (shown by dotted line in FIG. 3B), the angle of the reflected beam changes, and the beam impinges on the intermediate photodetector 156. If the substrate 101 continues to warp, the angle of the reflected beam changes, and the beam impinges on the upper photodetector 157. Signals from the detection device 150 indicating the location of the beam (i.e., which photodetector the beam is impinging on), and thus, the amount of warping of the substrate 101 are provided to the controller 126. The controller 126 may provide feedback to an operator indicating the amount of substrate 101 warping. Additionally, the controller 126 and detection device 150 may be calibrated to take action if a programmed threshold is reached. For instance, the controller 126 may send instructions for shutting down the process or signal the operator that undesirable substrate warping has occurred upon detecting beam movement beyond the programmed threshold.

Figure 4A:
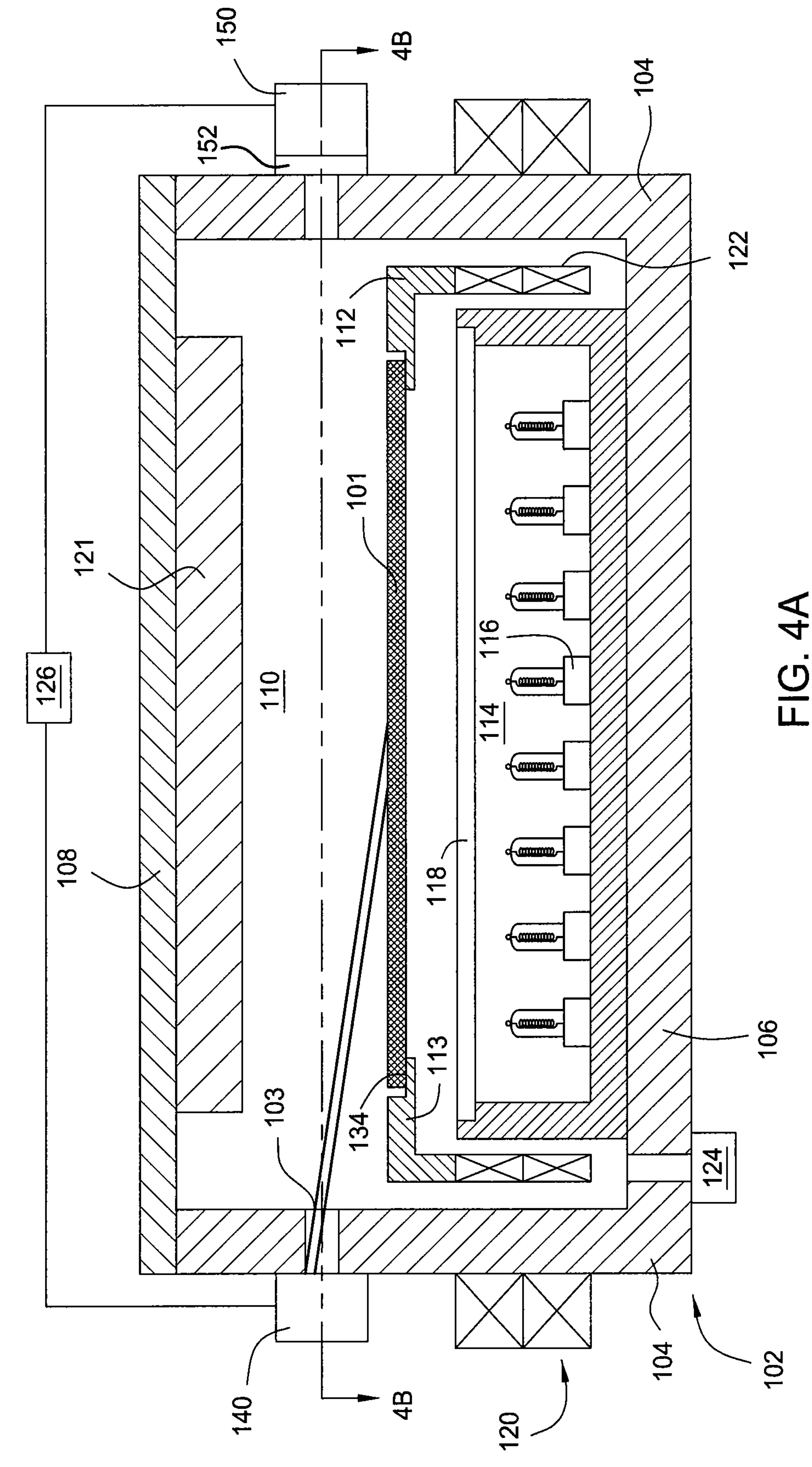
FIG. 4A is a schematic, cross-sectional view of an RTP chamber according to another embodiment.
Figure 4B:
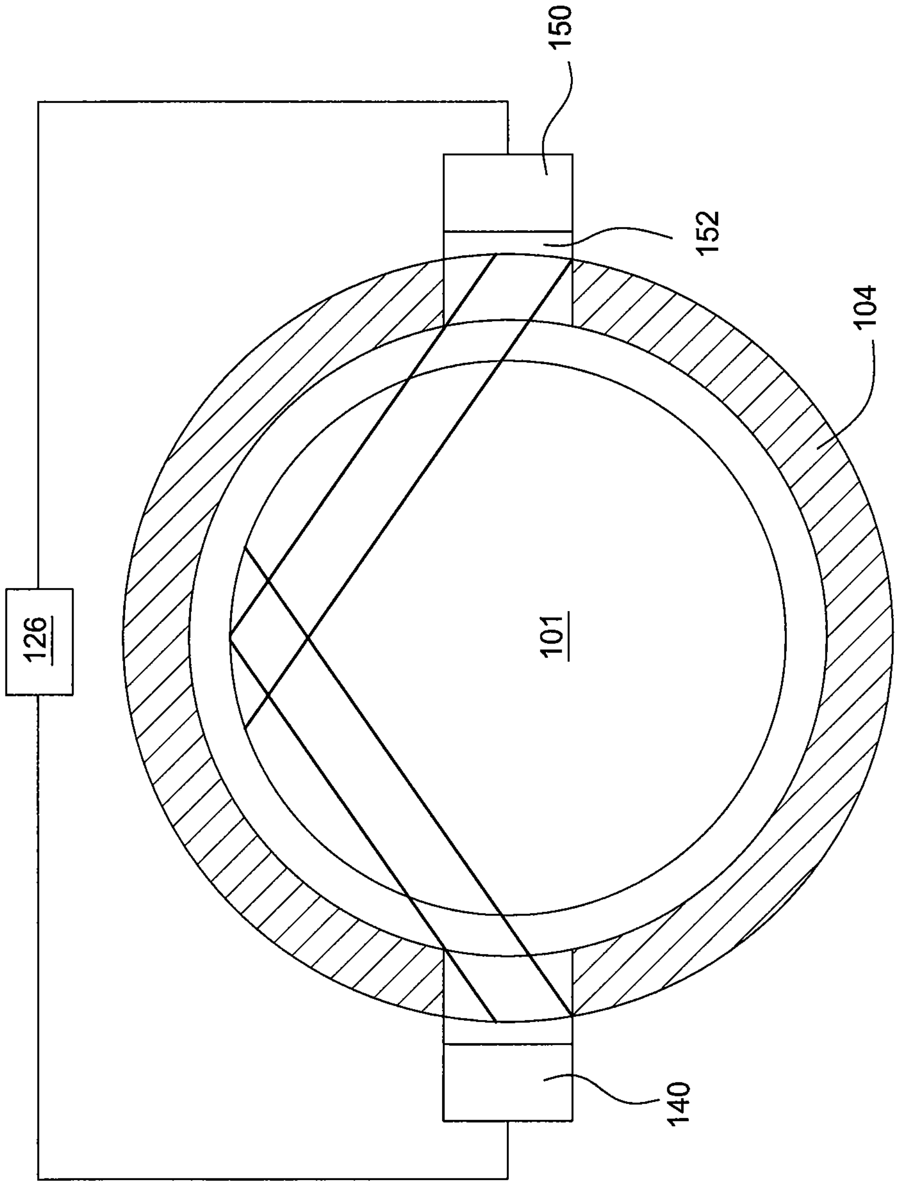
FIG. 4B is a schematic, top, cross-sectional view of the RTP chamber depicted in FIG. 4A taken along the section line B-B.

FIG. 4A is a schematic, cross-sectional view of the RTP chamber 100 according to another embodiment of the present invention, and FIG. 4B is a schematic, top, cross-sectional view of the RTP chamber depicted in FIG. 4A taken along the section line B-B. Similar to the embodiment depicted in FIG. 1, the laser device 140 and the detection device 150 are coupled to the chamber wall 104 on opposite sides of the chamber body 102. In the embodiment of FIGS. 4A and 4*b*, the laser device 140 is configured to provide a wider scan of light, rather than a small beam, in order to illuminate an edge region of the substrate 101. The detection device 150 is a camera (e.g., CCD camera) directed toward the illuminated region of the substrate 101.

In operation, the controller 126 provides instructions to the laser device 140, which projects a wide scan of light toward an edge region of the rotating substrate 101. The light impinging on the substrate 101, at ambient temperature, from the laser device 140 is scattered, and images are captured by the detection device 150 of the illuminated region of the substrate 101 showing the pattern of scattered light. As the RTP chamber 100 heats the rotating substrate 101, if the substrate begins to warp, the pattern of scattered light of the illuminated region of the substrate 101 changes, and images of the illuminated region are captured by the detection device 150 showing the changed pattern of light. These images are sent to the controller 126. The controller 126 may provide the images to an operator for monitoring the condition of the substrate 101 during processing. The controller 126 may be programmed to compare the images to stored images and determine when substrate 101 has exceeded a threshold amount of warping. At that point, the controller 126 may shut down the process or signal the operator that an undesirable amount of substrate warping has occurred in order to prevent substrate and/or equipment damage.

Therefore, a number of alternatives are described for detecting substrate warping during RTP processing. In one embodiment, one or more beams of light are provided above and across the substrate being processed. In this embodiment, the amount of beam blockage correlates to the amount of substrate warping. In another embodiment, a beam of light is reflected off of a substrate during processing. In this embodiment, the amount of movement of the beam correlates to the amount of substrate warping. In yet another embodiment, a region of a substrate is illuminated during processing. In this embodiment, images of the illuminated region are analyzed to determine the amount of substrate warping.

While the foregoing is directed to embodiments of the present invention, other and further embodiments of the invention may be devised without departing from the basic scope thereof, and the scope thereof is determined by the claims that follow. For example, although the chamber body 102 is depicted and described as being cylindrical, the chamber body 102 may configured differently, such as having multiple side walls (e.g., square, hexagonal, octagonal).

The invention claimed is:

1. A chamber, comprising:
- one or more chamber walls, a chamber bottom, and a chamber lid enclosing a processing volume;
- a mirror coupled to the one or more chamber walls;
- a substrate support disposed within the processing volume;
- a laser device positioned to emit a beam of light substantially parallel to an upper surface of the substrate support; and
- a detection device coupled to the chamber above the substrate support.

2. The chamber of claim 1, wherein the detection device is configured to detect an amount of the beam of light impinging upon the detection device.

3. The chamber of claim 2, wherein the detection device is positioned on a side of the chamber opposite the laser device.

4. The chamber of claim 2, wherein the detection device is positioned adjacent the laser device.

5. The chamber of claim 2, wherein the laser device is positioned to emit the beam of light at less than a one degree angle from parallel.

6. The chamber of claim 2, wherein an aperture in the chamber wall adjacent the detection device has a length to diameter ratio of between about 5:1 and about 10:1.

7. The chamber of claim 2, further comprising a controller configured to receive signals from the detection device and send signals indicating an undesirable amount of substrate warping has occurred when the received signals indicate that a threshold amount of the beam of light is blocked from the detection device.

8. The chamber of claim 2, further comprising a radiant heat source positioned below the substrate support.

9. The chamber of claim 8, wherein the radiant heat source comprises a plurality of lamps.

10. A rapid thermal processing chamber, comprising:
- one or more chamber walls, a chamber bottom, and a chamber lid enclosing a processing volume;
- a mirror coupled to the one or more chamber walls;
- a substrate support disposed within the processing volume;
- a laser device coupled to the chamber above the substrate support, wherein the laser device is positioned to emit a first beam of light toward the mirror; and
- a detection device to determine an amount of change in a position of a second beam of light, wherein the second beam of light is a reflection of the first beam of light from the mirror.

11. The chamber of claim 10, wherein the detection device comprises a position sensitive detector or a camera.

12. The chamber of claim 10, wherein the detection device comprises a plurality of stacked photodetectors.

13. The chamber of claim 10, wherein the amount of change in the position of the second beam of light correlates to an angle deviation of the second beam of light.

14. The chamber of claim 13, further comprising a controller configured to receive signals from the detection device and send signals indicating an undesirable amount of substrate warping has occurred when the received signals indicate that a position of the second beam of light has changed beyond a specified threshold.

15. The chamber of claim 14, wherein the specified threshold correlates to an angle deviation of 0.5 degrees.

* * * * *